United States Patent
Deng

(10) Patent No.: US 11,161,041 B2
(45) Date of Patent: Nov. 2, 2021

(54) VIRTUAL OBJECT CONTROL METHOD AND APPARATUS, ELECTRONIC APPARATUS, AND STORAGE MEDIUM

(71) Applicant: Tencent Technology (Shenzhen) Company Limited, Shenzhen (CN)

(72) Inventor: Yang Deng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/893,773

(22) Filed: Jun. 5, 2020

(65) Prior Publication Data

US 2020/0298121 A1 Sep. 24, 2020

Related U.S. Application Data

(63) Continuation of application No. PCT/CN2018/117034, filed on Nov. 22, 2018.

(30) Foreign Application Priority Data

Feb. 9, 2018 (CN) .......................... 201810132647.8

(51) Int. Cl.
*A63F 13/57* (2014.01)
*A63F 13/2145* (2014.01)
*A63F 13/537* (2014.01)

(52) U.S. Cl.
CPC .......... *A63F 13/57* (2014.09); *A63F 13/2145* (2014.09); *A63F 13/537* (2014.09)

(58) Field of Classification Search
CPC .... A63F 13/2145; A63F 13/52; A63F 13/537; A63F 13/57
See application file for complete search history.

(56) References Cited

U.S. PATENT DOCUMENTS 5,622,337 A * 4/1997 Unruh .................... B64D 23/00
244/142
2012/0329558 A1* 12/2012 Haigh-Hutchinson ......................
A63F 13/04
463/32

(Continued)

FOREIGN PATENT DOCUMENTS

| CN | 105460223 A | 4/2016 |
|---|---|---|
| CN | 206597301 U | 10/2017 |

(Continued)

OTHER PUBLICATIONS

Android Gameplay Weekly, "WingSuit Simulator 3D—Android Gameplay—Fly To The Sky!", Feb. 7, 2017, pp. 1-9, at https://www.youtube.com/watch?v=Xp6PUQYI3Jo (last visited Jun. 23, 2021). (Year: 2017).*

(Continued)

*Primary Examiner* — Steve Rowland
(74) *Attorney, Agent, or Firm* — Crowell & Moring LLP

(57) ABSTRACT

The present disclosure provides method and apparatus, an electronic apparatus, and a storage medium for a virtual object control, and relates to the field of computer technologies. In the present disclosure, when a touch operation in a control region is detected, a viewing angle of a virtual scene is determined; an acceleration of a virtual object during a falling process is obtained with reference to the touch operation, the viewing angle, and the gravitational acceleration; and the virtual object is controlled to fall according to the acceleration. In this way, an action of a character can be realistically simulated by determining non-fixed moving directions and speeds.

18 Claims, 7 Drawing Sheets

(56) References Cited

U.S. PATENT DOCUMENTS

2017/0354887 A1* 12/2017 Bollermann ............ A63F 13/57
2018/0067547 A1*  3/2018 Russell .............. G02B 27/0093

FOREIGN PATENT DOCUMENTS

| CN | 206672404 U    | 11/2017 |
|----|----------------|---------|
| CN | 107472543 A    | 12/2017 |
| CN | 107506122 A    | 12/2017 |
| CN | 108245887 A    |  7/2018 |
| JP | 2014-208258 A  | 11/2014 |
| JP | 2017-035215 A  |  2/2017 |
| KR | 10-1089041 B1  | 12/2011 |
| KR | 101810834 B1 * | 12/2017 |

OTHER PUBLICATIONS

International Search Report and Written Opinion with English Translation for International Patent Application No. PCT/CN2018/117034 dated Feb. 21, 2019; 12 pages.

Office Action for Chinese Patent Application No. CN 2018101326478 dated May 6, 2019; 5 pages.

Office Action for Chinese Patent Application No. CN 2018101326478 dated Dec. 20, 2019; 5 pages.

Office Action with English Translation of Office Action Summary for Japanese Patent Application No. JPO 2020-541985 dated Aug. 2, 2021; 6 pages.

\* cited by examiner

VIRTUAL OBJECT CONTROL METHOD AND APPARATUS, ELECTRONIC APPARATUS, AND STORAGE MEDIUM

This application is a continuation application of the International PCT Application No. PCT/CN2018/117034, filed with the Chinese Patent Office on Nov. 22, 2018 which claims priority to Chinese Patent Application No. 2018101326478, filed with the Chinese Patent Office on Feb. 9, 2018 and entitled "VIRTUAL OBJECT CONTROL METHOD AND APPARATUS, ELECTRONIC APPARATUS, AND STORAGE MEDIUM", which are incorporated herein by reference in its entireties.

FIELD OF THE TECHNOLOGY

The present disclosure relates to the field of computer technologies, and in particular, to a method and apparatus, an electronic apparatus, and a storage medium for virtual object control.

BACKGROUND OF THE DISCLOSURE

With the development of computer technologies, people may simulate scenes in real life through a simulation technology, where the simulation technology refers to an experimental method in which a research object model is established by using the similarity principle, and the regularity of the prototype is indirectly researched by using the model. For example, in a game application, people may control a virtual object in a virtual scene and enable the virtual object to perform actions such as running, jumping, shooting, and parachuting, to simulate actions of a person in reality.

Currently, a virtual object control method is generally to set a virtual joystick region, determine a moving direction of the virtual object by detecting a touch operation of the user on the virtual joystick region, control the virtual object to move toward the moving direction, and display location changes of the virtual object at a fixed viewing angle, where the moving direction is generally upward, downward, leftward, or rightward.

SUMMARY

Embodiments of the present disclosure provide a virtual object control method and apparatus, an electronic apparatus, and a storage medium, to resolve a problem that actions of a virtual object cannot be realistically simulated. The technical solutions are as follows:

According to an aspect, a virtual object control method is provided, including: determining, in a case that a touch operation on a control region is detected, a viewing angle of a virtual scene, the control region being used for controlling a movement manner of a virtual object in the virtual scene; obtaining an acceleration of the virtual object during a falling process based on the touch operation in the control region, the viewing angle, and the gravitational acceleration; and controlling the virtual object to fall according to the acceleration in the virtual scene.

From another aspect, a virtual object control apparatus is provided, including:

a determining module, configured to determine, in a case that a touch operation on a control region is detected, a viewing angle of a virtual scene, the control region being used for controlling a movement manner of a virtual object in the virtual scene;

an obtaining module, configured to obtain an acceleration of the virtual object in a falling process based on the touch operation in the control region, the viewing angle, and the gravitational acceleration; and a control module, configured to control the virtual object to fall according to the acceleration in the virtual scene.

According to another aspect, an electronic apparatus is provided, including a processor and a memory configured to store a computer program, the processor being configured to execute the computer program stored in the memory, to implement the method operations according to the foregoing virtual object control method.

According to another aspect, a computer-readable storage medium is provided, storing a computer program, the computer program, when being executed by a processor, implementing the method operations according to the foregoing virtual object control method.

In the embodiments of the present disclosure, by detecting a touch operation on a control region, an acceleration of a virtual object is determined with reference to factors such as the touch operation, a viewing angle, and the gravitational acceleration, to control a movement of the virtual object. The direction of the acceleration is not fixed and the magnitude of the acceleration is not equal to zero, to enable the virtual object to move toward any direction, and further enable the virtual object to accelerate or decelerate, so that actions of a real person can be realistically simulated. The virtual scene may be a three dimensional (3D) virtual scene, or a two dimensional (2D) scene, the application has no limitation on this.

BRIEF DESCRIPTION OF THE DRAWINGS

The embodiments of the present invention will be further described in detail below with reference to the drawings. The accompanying drawings in the following description show merely some embodiments of the present disclosure, and a person of ordinary skill in the art may still derive other drawings from the accompanying drawings without creative efforts.

DESCRIPTION OF EMBODIMENTS

Figure 1:
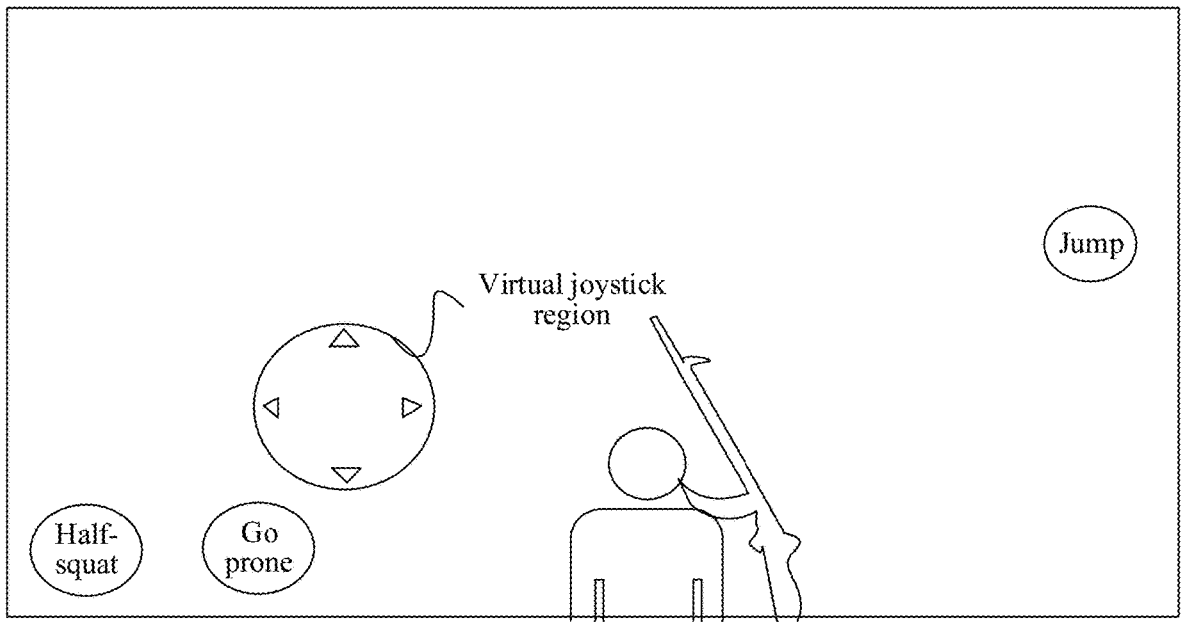
FIG. 1 is a schematic diagram of a terminal interface according to an embodiment of the present disclosure.

To make the objectives, technical solutions, and advantages of the present disclosure clearer, the following further describes the implementations of the present disclosure in detail with reference to the accompanying drawings.

In an embodiment of the present disclosure, a terminal may simulate a virtual scene according to the obtained scene data, and the virtual scene may be a virtual reality scene or a video game scene, or may be a simulated scene in a field such as national defense science education and physics teaching. Using the video game scene as an example, a user may perform a touch operation on a terminal. The terminal may determine game data corresponding to the touch operation according to the detected touch operation, and render and display the game data, where the game data may include data of a virtual scene, behavior data of a virtual object in the virtual scene, and the like.

The virtual scene involved in the embodiments of the present disclosure may be used for simulating a virtual space, the virtual space may be an open space, and the virtual scene may be a three-dimensional virtual scene or a two-dimensional virtual scene. This is not limited in the embodiments of the present disclosure. The user may control a virtual object to move in the virtual scene, the virtual object may be a virtual image used for representing a user in the virtual scene, and the virtual object has a shape and a volume in the virtual scene, and occupies some space of the virtual scene. The virtual image may be in any form, such as a person or an animal. This is not limited in the embodiments of the present disclosure.

To simulate an actual scene, the three-dimensional virtual space may include a sky region and non-sky regions, and the non-sky regions may be a land region and an ocean region. In a case that the virtual object is located in the sky region, due to the effect of gravity, a moving process of the virtual object is a falling process, and the user may perform a touch operation during the falling process of the virtual object, and choose, by changing a falling speed and an offset direction of the virtual object during the falling process, to land on different landing points. The method may be further applied to a process of diving in the ocean region, and in this case, an acceleration of the virtual object during diving may be adjusted based on the touch operation, to change a speed of diving, a moving direction, and the like.

A method for the terminal to determine that the virtual object is located in the sky region may be a ray detection method. The terminal may emit a ray vertically downward from a designated part of the virtual object, to detect a distance between the virtual object and an object in a vertically downward direction of the virtual object, and in a case that the distance is not zero, the terminal may determine that the virtual object is located in the sky region. For example, the designated part may be a foot of the virtual object or the head of the virtual object. This is not limited in the embodiments of the present disclosure. Specifically, the terminal may invoke a ray detection function to perform the foregoing ray detection step, and detect whether collision occurs between the virtual object and the ground or an object on the ground according to the ray detection function, to determine whether the virtual object gets in touch with the ground or an object on the ground. If the virtual object does not get in touch with the ground or an object on the ground, then it may be determined that the virtual object is located in the sky region. In another implementation, the terminal may further detect coordinates of an object located in a vertically downward direction of the virtual object in a World Coordinate System through a ray, and determine whether the virtual object gets in touch with the object based on the coordinates of the object and coordinates of the virtual object, to further determine whether the virtual object is located in the sky region. In another implementation, the terminal may further check whether a value of a vector of a ray starting from the virtual object to the ground or an object on the ground is zero, to determine whether the virtual object is located in the sky region. If the value of the vector of the ray is not zero, it may be determined that the virtual object is located in the sky region. The terminal may further project, after detecting an object on the ground or the ground through a ray, the object or the ground and the virtual object onto a plane, to calculate a distance between the virtual object and the object or the ground. In another implementation, the plane may be a plane perpendicular to the ground, and a ray detection method that is specifically adopted for determining whether the virtual object is located in the sky region is not limited in the embodiments of the present disclosure.

If the virtual object is located in a non-sky region, in addition to the gravity, there may be further a support force of the ground or a vertically upward buoyant force in an ocean in a vertical direction in the virtual scene, so that the virtual object does not fall anymore, and the user may control the virtual object to perform actions such as walking, running, jumping, and crawling on the land, or perform actions such as floating and swimming in the ocean. Correspondingly, if locations of the virtual object in the virtual scene are different, manners about how the terminal controls the virtual object to simulate the foregoing actions based on a touch operation may also be different. For specific details about how the terminal controls the virtual object to move based on a touch operation, reference may be found in FIG. 4.

The user may control a moving speed as well as a moving direction of the virtual object by a touch operation. Because the virtual object is a virtual avatar of the user, using a first-person viewing angle as an example: a virtual scene viewed by the user is generally a virtual scene observed from a viewing angle of the virtual object. Since in real life, the viewing angle of a person is normally the front of the person, a control manner may be provided: changing a moving direction of the virtual object by adjusting a viewing angle of the virtual scene. The terminal may further provide a control region, the control region is used for controlling a moving manner of the virtual object in the virtual scene, and the terminal may determine a moving direction and a moving speed of the virtual object with reference to the viewing angle of the virtual scene and a touch operation in the control region.

In one implementation, the control region may be a virtual joystick region, or may be a virtual control region, or alternatively a region where a real joystick control device is located. There is no limitation in any means in the embodiments of the present disclosure. Correspondingly, if the control region is a virtual joystick region, a touch operation of the user in the control region may be a slide operation, or may be a tap operation. This is not limited in the embodiments of the present disclosure. If the control region is a virtual control region, the virtual control region is a region that may be monitored by a camera. A touch operation of the user on the virtual control region may be a gesture operation, and the terminal may control the virtual object to move according to the gesture operation collected by the camera. If the control region is a region in which a joystick control is located, a touch operation of the user in the control region may be a press operation, a toggle operation, or the like.

For the virtual joystick region, a shape of the virtual joystick region may be, but is not limited to, a circle or a semi-circle. The virtual joystick region may have one origin, and the origin may be located in a center of the virtual joystick region, or may be located in another designated location. This is not limited in the embodiments of the present disclosure. The terminal may determine a moving direction and a moving speed of the virtual object that a user intends to control according to relative locations between an end point and the origin of the touch operation of the user.

FIG. 1 is a schematic diagram of a terminal interface according to an embodiment of the present disclosure. As shown in FIG. 1, using an example in which the virtual joystick region is circular and a touch operation of the user on the virtual joystick region is a slide operation, there may be four directional arrow icons in the virtual joystick region, and the four directional arrow icons are respectively upper, lower, left, and right respectively used for representing forward, backward, leftward, and rightward direction. The four directional arrow icons are merely used for making pointing directions of the virtual joystick region more direct, to provide guidance about how the user determines a direction corresponding to a user operation. The four directional arrow icons may alternatively not be displayed in the virtual joystick region, and the user may be gradually familiar with the touch operation on the virtual joystick region according to an actual operation situation. When end points of touch operations of the user are located in directions indicated by the four directional arrow icons, the touch operations may be respectively referred to as a first touch operation, a second touch operation, a third touch operation, and a fourth touch operation.

In one implementation, the terminal may determine, according to a distance between the end point and the origin of the touch operation in the virtual joystick region, magnitude of an acceleration corresponding to the touch operation, the acceleration is an acceleration triggered by the touch operation and applied to the virtual object, and the acceleration is used for controlling a moving direction and a moving speed of the virtual object. For example, magnitude of the acceleration corresponding to the touch operation may be positively correlated with and the distance between the end point and the origin point of the touch operation. That is, a larger distance between the end point and the origin point of touch operation in the virtual joystick region indicates a larger acceleration corresponding to the touch operation. Alternatively, the terminal may determine, according to a pressure value of the touch operation or the like, magnitude of the acceleration corresponding to the touch operation. The magnitude of the acceleration corresponding to the touch operation and the pressure value of the touch operation may be positively correlated. This is not limited in the embodiments of the present disclosure.

When the end point of the touch operation detected by the terminal is located between directions indicated by two adjacent directional arrow icons, the terminal may determine that the touch operation includes two touch sub-operations. For example, when the end point of the touch operation detected by the terminal is located between a direction in which the first touch operation is located and a direction in which the third touch operation is located, that is, when the end point of the touch operation is located on the top left of the origin of the virtual joystick region, the terminal may determine that the touch operation includes the first touch operation and the third touch operation. Furthermore, magnitude of accelerations respectively corresponding to the first touch operation and the third touch operation corresponding to the touch operation may be determined according to the relative locations between the end point and the origin of the touch operation in the virtual joystick region. In one implementation, the terminal may further directly determine a direction and magnitude of the acceleration corresponding to the touch operation according to the relative locations between the touch operation and the origin of the virtual joystick region. The foregoing is an exemplary description for an operation setting of the virtual joystick region, the specific shape and the operation setting of the virtual joystick region may be adjusted according to an actual operation requirement, and this is not limited in the embodiments of the present disclosure.

For a viewing angle of the virtual scene, the viewing angle is a viewing angle for the user to view the virtual scene, and the terminal may display regions corresponding to different angles in the same virtual scene according to different viewing angles. In a case that the virtual scene is displayed at the beginning, the terminal may provide a default viewing angle and a default orientation of the virtual object. The orientation of the virtual object may include a first orientation and a second orientation, the first orientation refers to a yaw angle in attitude angles of the virtual object, and the second orientation refers to a pitch angle in attitude angles of the virtual object. The pitch angle and the yaw angle are pitch coordinates and yaw coordinates in a preset Cartesian coordinate system using the center of the virtual object as the origin, the range of the pitch coordinates is from $-90°$ to $0°$, and the range of the yaw coordinates is from $-180°$ to $180°$.

Figure 2:
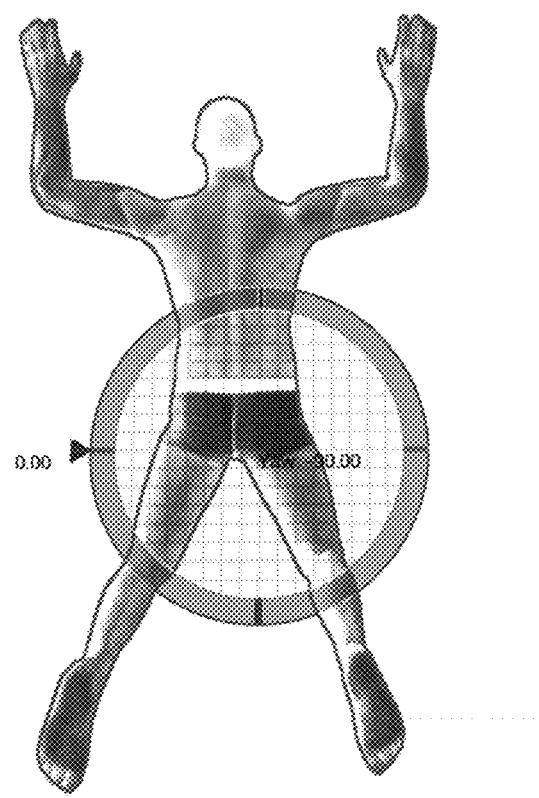
FIG. 2 is a schematic diagram of an orientation of a virtual object according to an embodiment of the present disclosure.
Figure 3:
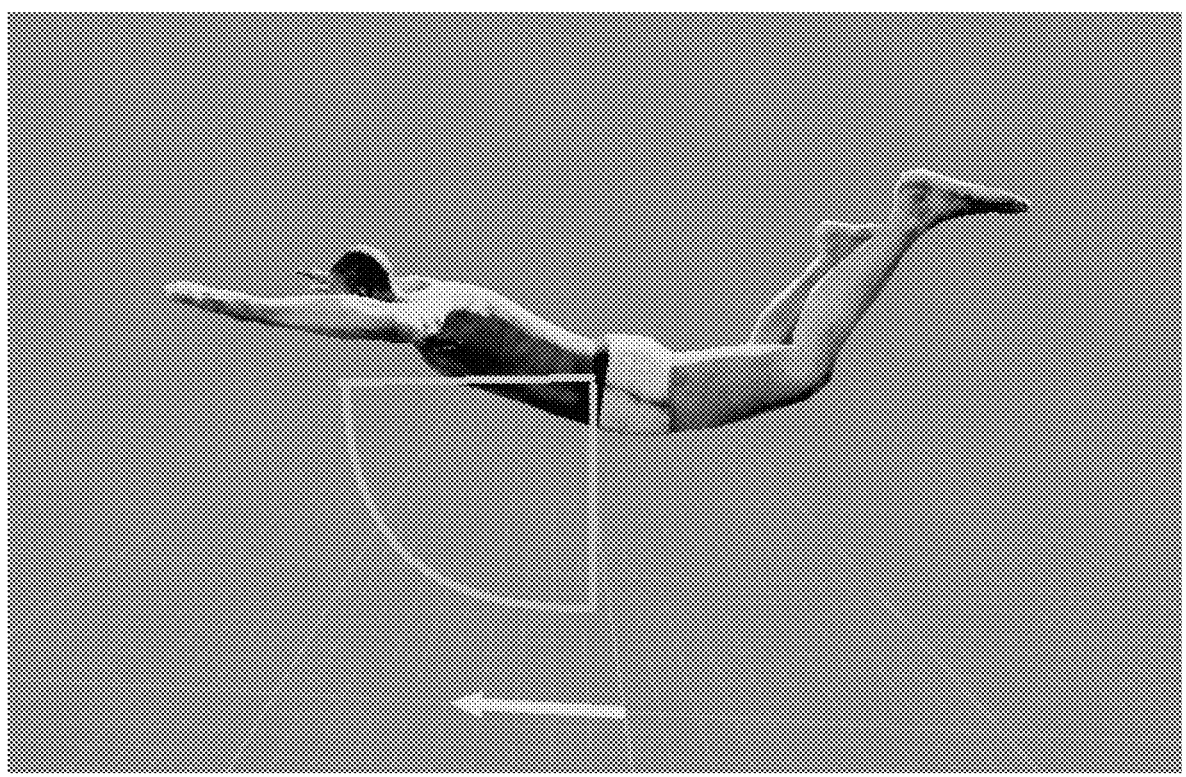
FIG. 3 is a schematic diagram of an orientation of a virtual object according to an embodiment of the present disclosure.

In one implementation, when an initial location of the virtual object may be the sky region in the virtual scene, the terminal may provide a first default viewing angle, and the first default viewing angle may be $45°$ in a lower front direction of the virtual object. When an initial location of the virtual object is a non-sky region in the virtual scene, the terminal may provide a second default viewing angle, and the second default viewing angle is the front of the virtual object in a standing posture. The default viewing angle is merely an exemplary description, and a setting of the default viewing angle is not limited in the embodiments of the present disclosure. For example, as shown in FIG. 2, the default first orientation of the virtual object may be $-90°$, and as shown in FIG. 3, the default second orientation of the virtual object may be $-90°$. Correspondingly, the yaw angle of the first default viewing angle may be $-90°$, and the pitch angle may be $-45°$.

Figure 4:
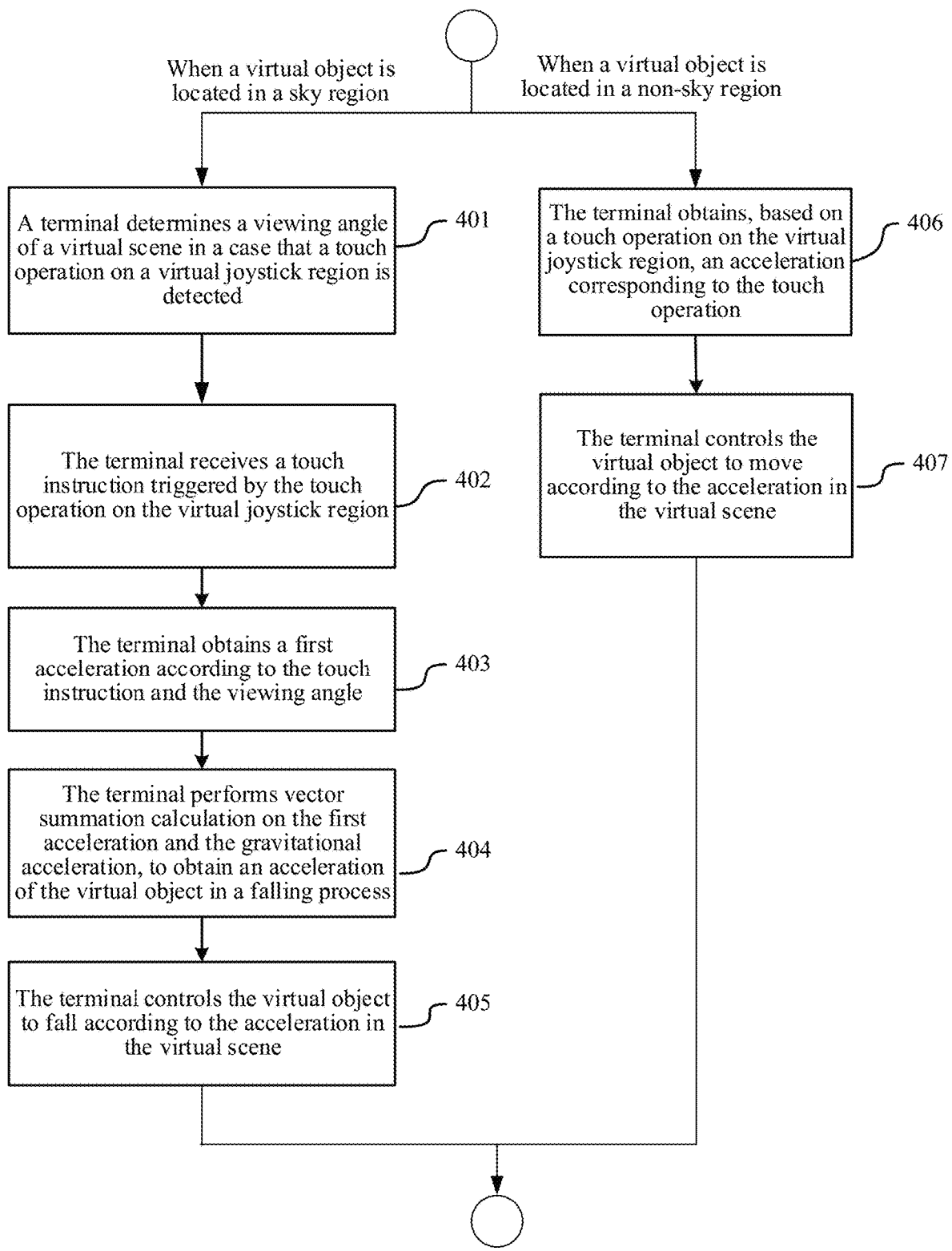
FIG. 4 is a flowchart of a virtual object control method according to an embodiment of the present disclosure.

FIG. 4 is a flowchart of a virtual object control method according to an embodiment of the present disclosure. In this embodiment, the virtual object control method is applied to a video game scene, and the control region is a virtual joystick region. Refer to FIG. 4, the virtual object control method includes the following steps:

401: A terminal determines a viewing angle of a virtual scene when a touch operation on a virtual joystick region is detected.

To enable the user to control the virtual object to move by simple operations, as well as freely control the virtual object to accelerate, decelerate, or change a moving direction, the terminal may provide the foregoing virtual joystick region and the viewing angle of the virtual scene, and the user may change a moving direction of the virtual object by adjusting the viewing angle. In this scenario, when a touch operation on the virtual joystick region is detected, the terminal needs to determine the viewing angle of the virtual scene, to further determine how the user intends to control the virtual object to move.

In one implementation, the user may adjust the viewing angle by performing a viewing angle adjusting operation on the terminal, and when the terminal detects the viewing angle adjusting operation, the terminal may adjust the viewing angle according to the viewing angle adjusting operation. The viewing angle adjusting operation may be a slide operation or a tap operation. Using slide operation as an example, the user may perform a slide operation on a screen of the terminal, and when the terminal detects the slide operation, the viewing angle may be adjusted according to a slide direction of the slide operation, to make the moving direction of the viewing angle to be the same as the slide direction. Optionally, an angle by which the viewing angle moves may be in direct proportion to a sliding distance of the slide operation. That is, a larger sliding distance indicates a larger angle by which the viewing angle moves. In one implementation, the user may alternatively set another virtual joystick region, and the another virtual joystick region is used by the terminal to detect the touch operation of the user to adjust the viewing angle. When the terminal detects a touch operation in the virtual joystick region, a viewing angle adjustment of both direction and angle corresponding to the touch operation are determined according to relative locations between an end point and an origin of the touch operation in the virtual joystick region. Optionally, a direction of the end point of the touch operation relative to the origin in the virtual joystick region is the same as the viewing angle adjustment direction, and the viewing angle adjustment angle is positively correlated to a distance between the end point and the origin of the touch operation in the virtual joystick region. That is, a larger distance indicates a larger viewing angle adjustment angle.

When the terminal detects the foregoing viewing angle adjusting operation, in addition to adjusting the viewing angle, a first orientation of the virtual object may be further adjusted according to the viewing angle after the adjustment, to make the yaw angle of the virtual object to be the same as the yaw angle of the viewing angle, to simulate a scene in which after a real person adjusts a gliding direction in the sky region, the viewing angle changes along with the adjustment. For example, when the terminal detects the viewing angle adjusting operation, the terminal adjusts the yaw angle of the viewing angle from −90° to −45°, and also adjusts the first orientation of the virtual object to −45°, to make the virtual object to still keep a state of facing toward the currently displayed virtual scene.

To enable the user to observe a surrounding environment better during the falling process, which helps to further selecting a landing point based on the surrounding environment or observing whether there is another virtual object in the surrounding environment, the terminal may further provide an observation viewing angle function button. When the terminal detects a touch operation on the observation viewing angle function button, the terminal may adjust the viewing angle according to an operation direction of the touch operation on the observation viewing angle function button, and the terminal may not adjust the first orientation of the virtual object according to the touch operation on the observation viewing angle function button. The touch operation may be performed on a designated region centered on the observation viewing angle function button, a shape of the target region may be a circle, or may be another shape, and the shape and a size of the target region are not limited in the embodiments of the present disclosure. To represent the function of the observation viewing angle function button more vividly, a form of the observation viewing angle function button may be eye-shaped. The observation viewing angle function button may be alternatively in another shape, and this is not limited in the embodiments of the present disclosure. When the terminal detects that the touch operation on the observation viewing angle function button disappears, the viewing angle may be adjusted back to the viewing angle before a touch operation is performed on the observation viewing angle function button. In one implementation, a specific operation of the user on the observation viewing angle function button may be: first touching and holding the observation viewing angle function button, and then sliding or dragging around the observation viewing angle function button. When the terminal detects a touch operation of the user on the observation viewing angle function button, the viewing angle may be adjusted according to the user operation and a virtual scene may be provided according to the viewing angle after the adjustment, so that the user may observe a surrounding environment of the virtual object, which helps the user to select a landing point based on the current surrounding environment and perform a next operation.

The viewing angle of the virtual scene determined by the terminal in step 401 is not the viewing angle adjusted according to the touch operation on the observation viewing angle function button. In a case that the terminal is performing a viewing angle adjustment according to a touch operation on the observation viewing angle function button while the terminal detects a touch operation on the virtual joystick region, the viewing angle of the virtual scene determined by the terminal is a viewing angle before the viewing angle adjustment is performed according to the touch operation on the observation viewing angle function button.

In one implementation, when the terminal detects the touch operation, a location of the virtual object in the virtual scene may be detected. When detecting that the virtual object is located in the sky region of the virtual scene, the virtual object is in a gliding state, the user may control a landing point of the falling and a falling speed of the virtual object according to the foregoing described virtual joystick region and the viewing angle of the virtual scene, and the terminal may perform the step of determining the viewing angle of the virtual scene in this step. When detecting that the virtual object is located in a non-sky region of the virtual scene, the virtual object is in a standing posture on the land or in a swimming posture in the ocean, the user may directly perform a touch operation on the virtual joystick region, to control the virtual object to move towards the surroundings. The virtual object may move toward any direction among the surrounding 360° directions according to different moving directions indicated by the touch operation, and the terminal may not need to perform step 401 but perform step 406 instead, to control the virtual object to move based on the touch operation of the user. The user may alternatively adjust the viewing angle of the virtual scene to adjust a front orientation of the virtual object, so that a moving direction of the virtual object may be changed during forward moving, to simulate scenes in which a real person turns to move, or moves toward each direction while the front of the person is not changed.

Step 402: The terminal receives a touch instruction triggered by the touch operation on the virtual joystick region.

The touch operations detected by the terminal may be different, and correspondingly, touch instructions received by the terminal may also be different. Corresponding to the first touch operation, the second touch operation, the third touch operation, and the fourth touch operation that are described above, the terminal may receive a first touch instruction, a second touch instruction, a third touch instruction, and a fourth touch instruction. In one implementation, in a case that the end point of the touch operation mentioned in the foregoing embodiment is located between directions indicated by two adjacent directional arrow icons, the terminal may obtain two touch instructions triggered by the touch operation, and the two touch instructions may be touch instructions corresponding to touch operations corresponding to directions indicated by the two adjacent directional arrow icons. Alternatively, the terminal may obtain a touch instruction triggered by the touch operation, and then a moving effect of the virtual object indicated by the touch instruction may be an overlapping effect of the two touch instructions in the foregoing implementation. There is no limitation on which of the foregoing two methods is adopted in the embodiment.

Step 403: The terminal obtains a first acceleration according to the touch instruction and the viewing angle.

When the touch instruction is different or the viewing angle is different, magnitude and a direction of the first acceleration are also different. In step 403, the terminal may determine, according to a direction indicated by the touch instruction and a direction of the viewing angle, a direction of the first acceleration, and determine, based on the touch instruction, whether the magnitude of a first acceleration is a first preset threshold or a second preset threshold. Specifically, the touch instruction may include four touch instructions, and the first acceleration obtained by the terminal may include the following four situations:

First situation: When the touch instruction is a first touch instruction, obtain the first acceleration with the magnitude as the first preset threshold and the direction as the viewing angle direction. The first touch instruction is used for instructing to control the virtual object to accelerate. In the first situation, the terminal may determine, according to the direction "forward" indicated by the first touch instruction and the viewing angle direction, that the direction of the first acceleration is the viewing angle direction, and determine, according to the first touch instruction, that the magnitude of the first acceleration is the first preset threshold.

Second situation: In a case that the touch instruction is a second touch instruction, obtain the first acceleration with the magnitude as the first preset threshold and the direction as the reverse direction of the viewing angle. The second touch instruction is used for instructing to control the virtual object to decelerate. In the second situation, the terminal may determine, according to the direction "backward" indicated by the second touch instruction and the viewing angle direction, that the direction of the first acceleration is the reverse direction of the viewing angle, and determine, according to the second touch instruction, that the magnitude of the first acceleration is the first preset threshold.

To summarize, the magnitude of the first acceleration corresponding to the first touch instruction and the second touch instruction is the first preset threshold.

For the first situation and the second situation, the first preset threshold may be set by a technician, the user may trigger the first touch instruction through the first touch operation, and the terminal may control the virtual object to accelerate to move forward according to the first touch instruction; alternatively, the user may trigger the second touch instruction through the second touch operation, and the terminal may control the virtual object to decelerate to move forward according to the second touch instruction, to achieve the objective of controlling the moving speed of the virtual object. The second touch operation is merely used for instructing to control the virtual object to decelerate, and the virtual object may not move backward in the sky region.

For example, in a video game scene, a virtual object controlled by the user may be located in an airplane together with other virtual objects, the airplane is moving toward a preset direction at a preset speed, and the user may perform related operations on the terminal, to control the virtual object to leave the airplane and fall. As shown in FIG. 2, the initial location of the virtual object may be in the sky region, the default first orientation of the virtual object may be −90°, and the left of the virtual object is 0°. As shown in FIG. 3, from the perspective of the side surface of the virtual object, the default second orientation of the virtual object may be −90°, and the vertically downward direction is 0°. The yaw angle of the first default viewing angle may be −90°, and the pitch angle may be −45°. When the touch operation performed by the user is the first touch operation, the terminal may receive the first touch instruction triggered by the first touch operation, and determine that the direction of the first acceleration corresponding to the first touch instruction is as follows: the yaw angle and the first orientation of the virtual object are the same and are both −90°, and the pitch angle and the yaw angle of the viewing angle are the same and are both −45°.

Third situation: When the touch instruction is a third touch instruction, obtain the first acceleration with the magnitude as the second preset threshold and the direction as the left of the virtual object. The third touch instruction being used for instructing to control the virtual object to move to the left. In the third situation, the terminal may determine, according to a direction "leftward" indicated by the third touch instruction and a viewing angle direction, that the direction of the first acceleration is the front left of the viewing angle direction, and determine, according to the third touch instruction, that the magnitude of the first acceleration is the second preset threshold.

Fourth situation: When the touch instruction is a fourth touch instruction, obtain the first acceleration with the magnitude as the second preset threshold and the direction as the right of the virtual object. The fourth touch instruction being used for instructing to control the virtual object to move to the right. In the fourth situation, the terminal may determine, according to a direction "rightward" indicated by the fourth touch instruction and a viewing angle direction, that the direction of the first acceleration is the front right of the viewing angle direction, and determine, according to the fourth touch instruction, that the magnitude of the first acceleration is the second preset threshold.

To summarize, the magnitude of the first acceleration corresponding to the third touch instruction and the fourth touch instruction is the second preset threshold.

For the third situation and the fourth situation, the second preset threshold may be set by a technician. Generally, a value of the second preset threshold is relatively small, the user may trigger the third touch instruction or the fourth touch instruction through the third touch operation or the fourth touch operation, and the terminal may control the virtual object to move to the left or the right slightly according to the third touch instruction or the fourth touch instruction, to achieve the objective of slightly correcting the moving direction of the virtual object in the left and right directions, so that the moving direction of the virtual object may be adjusted more precisely.

In one implementation, the terminal may receive two different touch instructions of the foregoing four kinds of touch instructions, the terminal may perform vector summation calculation on two first accelerations corresponding to the two touch instructions, to obtain a first acceleration corresponding to the touch operation of the user. That is, the first acceleration may be a vector sum of two sub first accelerations corresponding to the two touch instructions triggered by the touch operation. The foregoing is merely an exemplary description of determining a first acceleration according to a touch operation performed by a user. In one implementation, the terminal may directly receive the touch instruction triggered by the touch operation, the moving effect of the virtual object indicated by the touch instruction may be an overlapping effect of the foregoing two touch instructions, and a direction and magnitude of the first acceleration are determined according to the touch instruction. There is no limitation on which of the two foregoing implementations are adopted in the embodiment.

Step 404: The terminal performs vector summation calculation on the first acceleration and the gravitational acceleration, to obtain an acceleration of the virtual object during a falling process.

Because the virtual object is located in the sky region, in addition to the first acceleration corresponding to the touch operation of the user on the virtual object, the virtual object is subject to the effect of the gravitational acceleration, and the terminal may perform vector summation calculation on the first acceleration and the gravitational acceleration, to obtain an acceleration of the virtual object. Specifically, the terminal may determine the direction of the vector obtained by performing vector summation on the first acceleration and the gravitational acceleration as the direction of the acceleration of the virtual object, and determine magnitude of the vector obtained by performing vector summation on the first acceleration and the gravitational acceleration as the magnitude of the acceleration of the virtual object.

The foregoing step 402 to step 404 are a process for obtaining, based on the touch operation in the virtual joystick region, the viewing angle, and the gravitational acceleration, the acceleration of the virtual object during the falling process. When the user does not perform any touch operation in the control region, it indicates that the user intends the virtual object to fall freely, and human interference is not to be performed on the movement of the virtual object. In addition, the virtual object is located in the sky region of the virtual scene, and the virtual object may be subject to the effect of gravity, so that the terminal may use the gravitational acceleration as the acceleration of the virtual object.

Step 405: The terminal controls the virtual object to fall according to the acceleration in the virtual scene.

In a video game scene, the user may intend to control a falling track of the virtual object to select a more suitable landing point, to gain advantages in subsequent contention. For example, in a video game, competitive resources for virtual objects may be placed in buildings, the user may intend to control the virtual object to fall toward locations in which buildings are located, and the user may further intend to control the falling speed of the virtual object, so that the virtual object may land on the ground quickly, to seize the resources, or the user may intend to decelerate to fall, to gain more time to select a suitable landing point. The user performs the foregoing touch operation for a plurality of times during the falling process, so that the terminal may determine the direction and magnitude of the acceleration of the virtual object each time the terminal detects the touch operation, thereby controlling, based on the motion state of the virtual object when the touch operation is detected, the virtual object to dynamically change the speed and direction of the falling of the virtual object according to the acceleration in the virtual scene. For example, the virtual object originally performs free-fall motion, and when the terminal detects the first touch operation, it is learned through the foregoing steps that the direction of the acceleration of the virtual object is a lower front direction of the virtual object, and the terminal may control the virtual object to accelerate to move toward the lower front direction.

In one implementation, during the falling process, the terminal may further adjust a second orientation of the virtual object. When the terminal adjusts the second orientation of the virtual object, the second orientation may be adjusted according to the direction of the foregoing first acceleration. Specifically, when the direction of the first acceleration is the viewing angle direction, the terminal adjusts the second orientation of the virtual object during the falling process, to make the pitch angle of the virtual object to be the same as a pitch angle of the viewing angle, so that a scene in which a real person changes the orientation of the body during downward swooping may be simulated more realistically. When the direction of the first acceleration is the reverse direction of the viewing angle direction, the terminal adjusts the second orientation of the virtual object during the falling process, to make the pitch angle of the virtual object to be 0°, so that a scene in which a real person adjusts the orientation of the body during the falling process may be simulated more realistically.

In one implementation, a range of the pitch angle of the virtual object may be −90° to 0°, and the orientation of the virtual object may not be above the horizontal direction. That is, the virtual object may not move upward in the sky region. The terminal controls the virtual object to perform free-fall motion. When the first touch operation has been performed on the virtual object before, the terminal controls the virtual object to face the lower front direction and accelerate to move toward the lower front direction. Then, if currently, the user no longer performs touch operations on the virtual object, the acceleration of the virtual object is converted back into the gravitational acceleration, and the terminal may control the virtual object to continue to move toward the lower front direction. A motion track of the virtual object may be parabola-shaped, the moving speed of the virtual object in the horizontal direction no longer changes, and the second orientation of the virtual object is adjusted back to 0°. The range of the pitch angle of the virtual object may alternatively be another range, and there is no limitation in the embodiments of the present disclosure.

In one implementation, during the falling process, the terminal may further adjust the body posture of the virtual object according to the touch operation, so that the virtual object may simulate a body posture of a person that may appear in the air in the real scene during the falling process, thereby making the simulation result more realistic. Specifically, based on four different touch operations, the body postures corresponding to the touch operations are also different.

Figure 5:
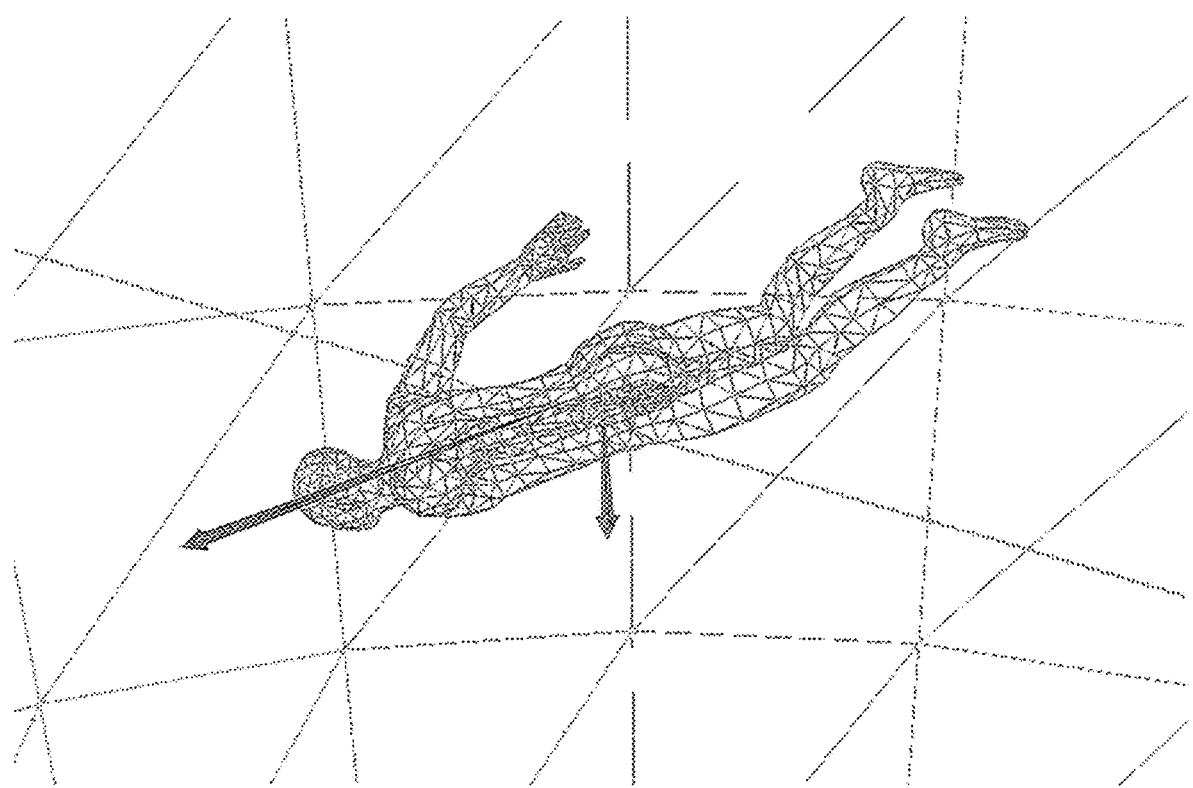
FIG. 5 is a schematic diagram of a body posture of a virtual object according to an embodiment of the present disclosure.

As shown in FIG. 5, when the touch operation is the first touch operation, the terminal controls the virtual object to be in a swooping posture, and the direction of the first acceleration corresponding to the first touch instruction triggered by the first touch operation is a forward direction from the head of the virtual object. That is, the direction of the first acceleration and the orientation of the virtual object are the same, and the acceleration of the virtual object further includes the gravitational acceleration, where the direction of the gravitational acceleration is vertically downward.

Figure 6:
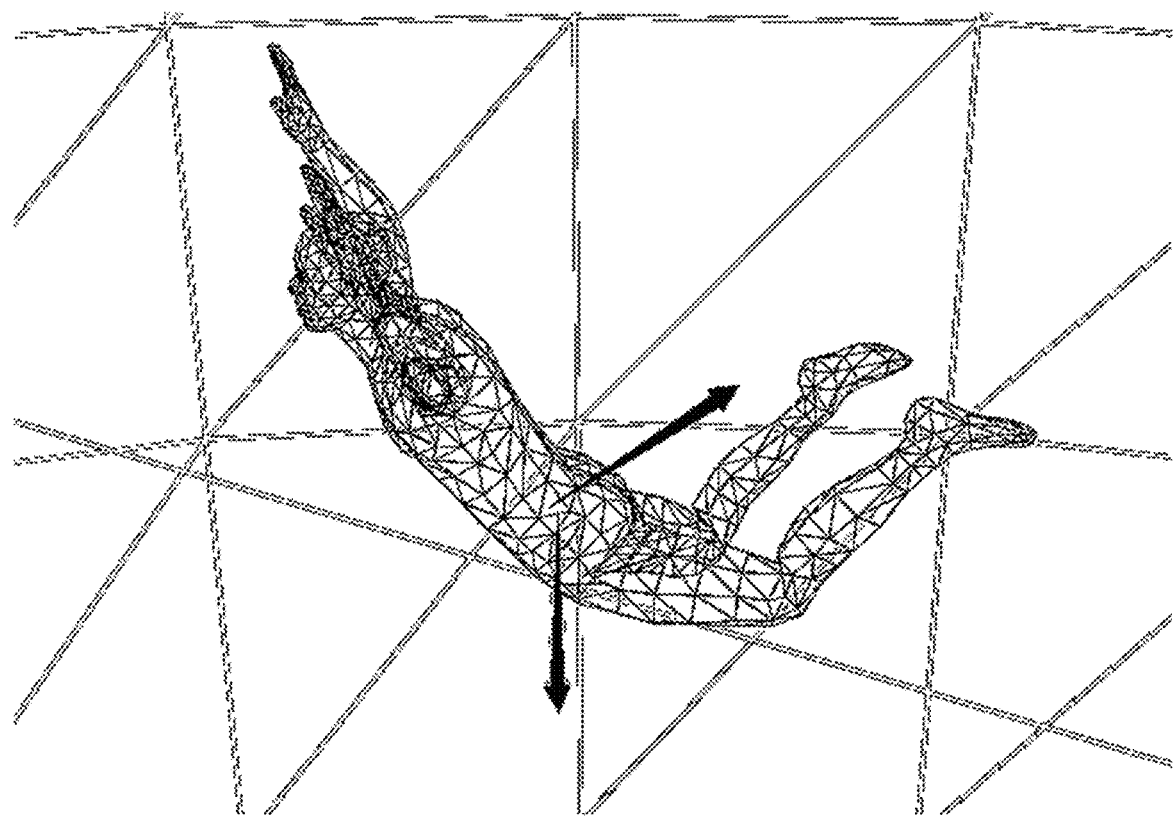
FIG. 6 is a schematic diagram of a body posture of a virtual object according to an embodiment of the present disclosure.

As shown in FIG. 6, when the touch operation is the second touch operation, the terminal controls the virtual object to be in a leaning-back posture, and the direction of the first acceleration corresponding to the second touch instruction triggered by the second touch operation is the rear of the virtual object. That is, the direction of the first acceleration and the direction of the viewing angle are reverse, and the acceleration of the virtual object further includes the gravitational acceleration, where the direction of the gravitational acceleration is vertically downward.

When the touch operation is the third touch operation, the terminal controls the virtual object to be in an posture of leaning to the left, and a direction of the first acceleration corresponding to the third touch instruction triggered by the third touch operation is leftward. The acceleration of the virtual object further includes the gravitational acceleration, where the direction of the gravitational acceleration is vertically downward.

Figure 7:
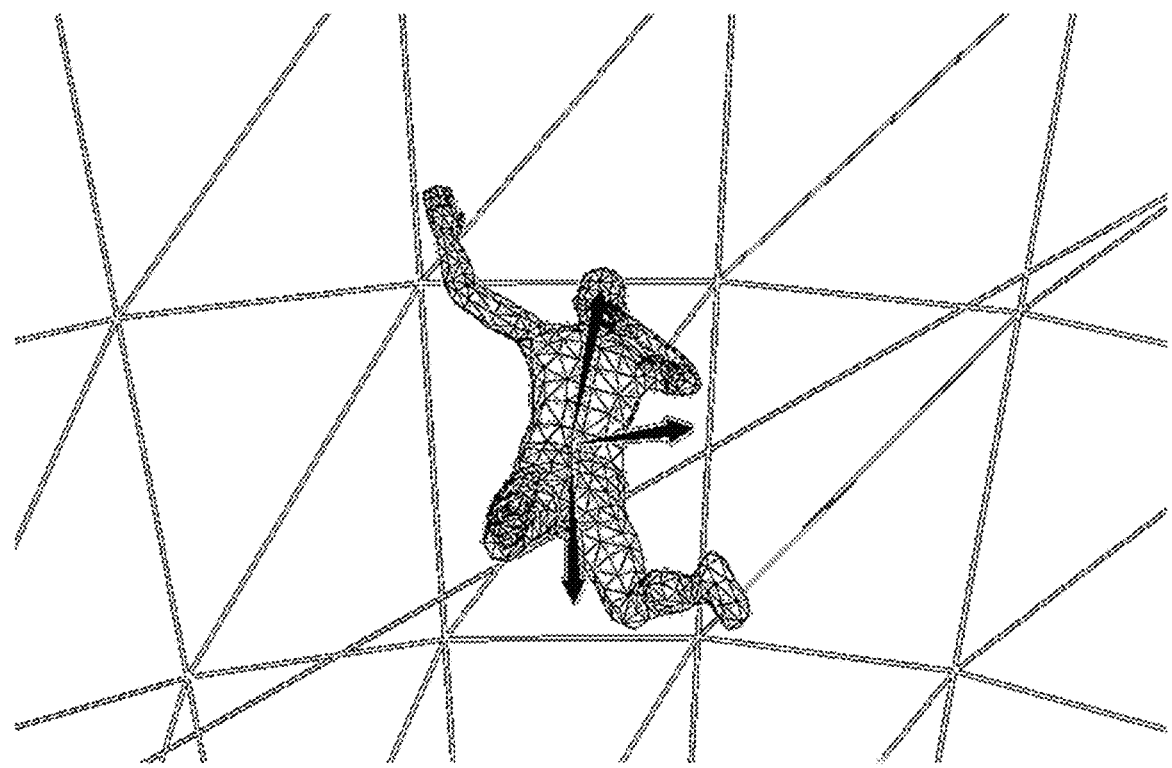
FIG. 7 is a schematic diagram of a body posture of a virtual object according to an embodiment of the present disclosure.

As shown in FIG. 7, when the touch operation is the fourth touch operation, the terminal controls the virtual object to be in an posture of leaning to the right, and a direction of the first acceleration corresponding to the fourth touch instruction triggered by the fourth touch operation is rightward. The acceleration of the virtual object further includes the gravitational acceleration, where the direction of the gravitational acceleration is vertically downward. The posture of leaning to the right and the posture of leaning to the left of the virtual object are mirror-symmetrical to each other by using a connecting line between the head and the feet of the virtual object as a central axis. In one implementation, at first the terminal detects the first touch operation, the virtual object is controlled to move forward while falling, then the fourth touch operation is detected, and the virtual object may slowly deviate to the right while keeping moving forward.

Figure 8:
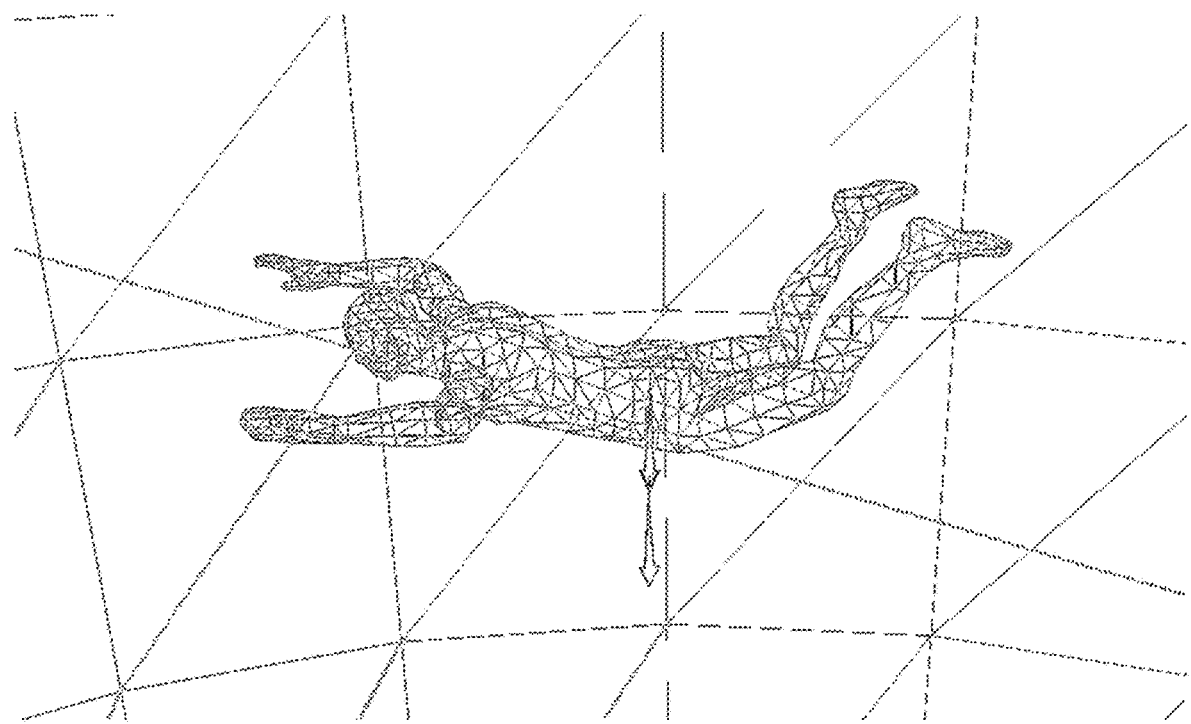
FIG. 8 is a schematic diagram of a body posture of a virtual object according to an embodiment of the present disclosure.

As shown in FIG. 8, if the terminal has not detected touch operation, while controlling the virtual object to perform free-fall motion, the terminal may further adjust the body posture of the virtual object to a posture of landing in the horizontal direction.

Based on the foregoing five body postures, there may be two extreme scenes: in a first special situation, the user may adjust the viewing angle to the horizontal direction, that is, the pitch angle is −90°, and then perform the first touch operation. When the terminal detects the first touch operation, it may be determined that a direction of a first acceleration corresponding to a first touch instruction triggered by the first touch operation is horizontally forward, and the direction of the gravitational acceleration is vertically downward, so that the terminal may control the virtual object to move toward the lower front direction, and a motion track may be a parabola. If the magnitude of the first acceleration is unchanged, and the direction of the first acceleration is horizontally forward, the virtual object may move to the farthest location in the horizontal direction, to implement "shallow swooping". In a second special situation, the user may adjust the viewing angle to the vertical direction, that is, the pitch angle is 0°, and then perform the first touch operation. When the terminal detects the first touch operation, it may be determined that a direction of a first acceleration corresponding to a first touch instruction triggered by the first touch operation and the direction of the gravitational acceleration are the same and both are vertically downward, so that the terminal may control the virtual object to move downward vertically, and control the pitch angle of the virtual object to be 0°, to swoop downward vertically, thereby landing on the ground fastest.

The foregoing step 401 to step 405 are a process for dynamically controlling the falling of the virtual object, and the terminal may perform the foregoing step 401 to step 405 in each frame. After the acceleration of the virtual object is obtained, a location of the virtual object in the next frame is calculated, and then the foregoing obtaining and calculation processes are repeated based on the user operation in the next frame, until the location of the virtual object is switched from the sky region to the non-sky region, and then the following step 406 and step 407 may be performed. In one implementation, a time interval between two adjacent frames may be determined by the user based on a performance parameter setting of the terminal. In this way, the acceleration of the virtual object is obtained in real time in each frame, and a location of the virtual object in the next frame is calculated according to the real-time acceleration, so that the terminal may render and display the next frame based on the location obtained through calculation. Therefore, the terminal may display the virtual object in the virtual scene, and present the falling process of the virtual object more realistically and precisely.

Step 406: The terminal obtains, based on a touch operation on the virtual joystick region, an acceleration corresponding to the touch operation.

When the virtual object is switched from the sky region to the non-sky region, or an initial location of the virtual object is located in the land region or the ocean region, the terminal may provide a second default viewing angle, and the second default viewing angle is the front of the virtual object in a standing posture.

When the virtual object is located in the non-sky region of the virtual scene, the terminal may control an initial posture of the virtual object to be a standing posture when the virtual object is still. Because the virtual object is not in the sky region, the virtual object has the vertical forces balanced, and the acceleration corresponding to the touch operation on the virtual joystick region detected by the terminal is the acceleration of the virtual object. Specifically, the terminal may receive a touch instruction triggered by a touch operation, and determine a direction indicated by the touch instruction as a direction of the acceleration of the virtual object. For example, when a direction indicated by the touch instruction corresponding to the touch operation is forward, the direction of the acceleration is the front of the virtual object; when a direction indicated by the touch instruction corresponding to the touch operation is backward, the direction of the acceleration is the rear of the virtual object; when a direction indicated by the touch instruction corresponding to the touch operation is leftward, the direction of the acceleration is the left of the virtual object; and when a direction indicated by the touch instruction corresponding to the touch operation is rightward, the direction of the acceleration is the right of the virtual object. Similarly, when a direction indicated by the touch instruction corresponding to the touch operation is the left front, the direction of the acceleration is the left front of the virtual object. The range of the directions indicated by the touch instruction corresponding to the touch operation is 360°, and the directions are not listed one by one herein in the embodiments of the present disclosure.

Step 407: The terminal controls the virtual object to move according to the acceleration in the virtual scene.

When the terminal obtains the acceleration of the virtual object according to step 406, the terminal may also control the virtual object to perform running, crawling, walking, swimming, or the like according to the acceleration in the virtual scene.

Figure 9:
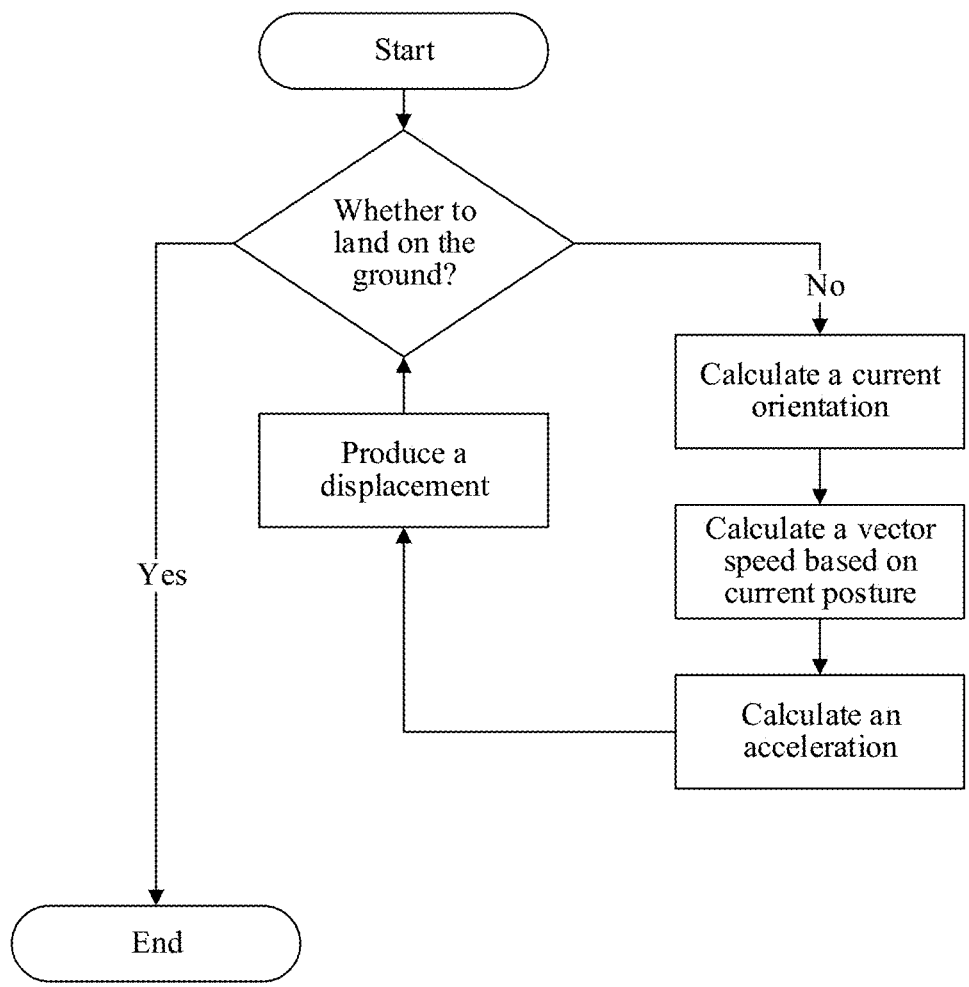
FIG. 9 is a flowchart of a virtual object control method according to an embodiment of the present disclosure.

FIG. 9 is a flowchart of a virtual object control method according to an embodiment of the present disclosure. Referring to FIG. 9, the terminal may detect, in each frame, whether the virtual object lands on the ground. When the virtual object does not land on the ground, the terminal may determine a current orientation of the virtual object and calculate a vector speed corresponding to a current touch operation on the virtual object, and then obtain a final acceleration of the virtual object by combining the vector speed and the gravitational acceleration, to determine, according to the final acceleration and a motion state and a location of the virtual object in the current frame, a location of the virtual object in the next frame, and detect whether the virtual object lands on the ground in the next frame. When detecting that the virtual object has landed on the ground, the terminal may stop the steps of calculating the orientation and the acceleration of the virtual object in the sky region.

In the embodiments of the present disclosure, by detecting a touch operation in a control region, an acceleration of a virtual object is determined with reference to factors such as the touch operation, the viewing angle, and the gravitational acceleration, to control a movement of the virtual object. The direction of the acceleration is not fixed and the magnitude of the acceleration is not equal to zero, to enable the virtual object to move toward any direction, and further enable the virtual object to accelerate or decelerate, so that actions of a real person can be realistically simulated. In addition, the terminal may control the orientation of the virtual object during the falling process, to allow the virtual object to adjust the body orientation according to different motion states, and simulate different orientations of a real person that may appear in the air more realistically. Furthermore, the terminal may control the body posture of the virtual object during the falling process, to allow the virtual object to perform corresponding body postures in different scenes, and simulate actions of a real person in a real scene more realistically.

All the foregoing optional technical solutions may be randomly combined to form optional embodiments of the present invention, which are not described in detail one by one herein.

Figure 10:
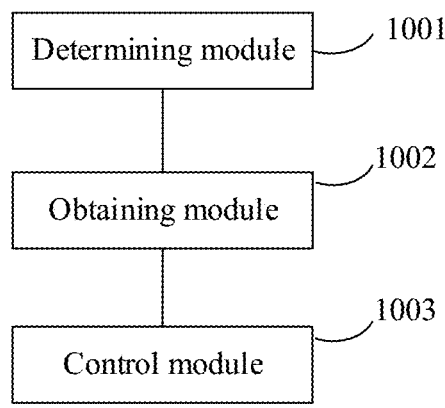
FIG. 10 is a schematic structural diagram of a virtual object control apparatus according to an embodiment of the present disclosure.

FIG. 10 is a schematic structural diagram of a virtual object control apparatus according to an embodiment of the present disclosure. The apparatus includes:

a determining module 1001, configured to determine, when a touch operation in a control region is detected, a viewing angle of a virtual scene, the control region being used for controlling a movement manner of a virtual object in the virtual scene;

an obtaining module 1002, configured to obtain an acceleration of the virtual object during a falling process, based on the touch operation in the control region, the viewing angle, and the gravitational acceleration; and a control module 1003, configured to control the virtual object to fall according to the acceleration in the virtual scene.

In another embodiment, the apparatus further includes:

a detection module, configured to detect a location of the virtual object in the virtual scene; and an execution module, configured to perform the operation of determining a viewing angle of a virtual scene when detecting that the virtual object is located in a sky region in the virtual scene.

In another embodiment, the obtaining module 1002 is further configured to obtain, when detecting that the virtual object is located in a non-sky region in the virtual scene, based on a touch operation in the control region, an acceleration corresponding to the touch operation; and the control module 1003 is further configured to control the virtual object to move according to the acceleration in the virtual scene.

In another embodiment, the apparatus further includes:

an adjustment module, configured to adjust, when a viewing angle adjusting operation is detected, the viewing angle according to the viewing angle adjusting operation, the viewing angle adjusting operation being used for adjusting the viewing angle of the virtual scene; and the adjustment module is further configured to adjust a first orientation of the virtual object according to a viewing angle after the adjustment, the first orientation of the virtual object referring to a yaw angle in attitude angles of the virtual object.

In another embodiment, the obtaining module 1002 is configured to:

receive a touch instruction triggered by the touch operation;

obtain a first acceleration according to the touch instruction and the viewing angle; and perform vector summation calculation on the first acceleration and the gravitational acceleration, to obtain an acceleration of the virtual object.

In another embodiment, the obtaining module 1002 is configured to use, if no touch operation in the control region is detected, the gravitational acceleration as the acceleration of the virtual object during a falling process.

In another embodiment, the obtaining module 1002 is configured to:

obtain, if the touch instruction is a first touch instruction, a first acceleration of which magnitude is a first preset threshold and a direction is a viewing angle direction, the first touch instruction being used for instructing to control the virtual object to accelerate.

In another embodiment, the obtaining module 1002 is configured to:

obtain, if the touch instruction is a second touch instruction, a first acceleration of which magnitude is a first preset threshold and a direction is a reverse direction of a viewing angle direction, the second touch instruction being used for instructing to control the virtual object to decelerate.

In another embodiment, the obtaining module 1002 is configured to:

obtain, in a case that the touch instruction is a third touch instruction, a first acceleration of which magnitude is a second preset threshold and a direction is the left of the virtual object, the third touch instruction being used for instructing to control the virtual object to move to the left.

In another embodiment, the obtaining module 1002 is configured to:

obtain, in a case that the touch instruction is a fourth touch instruction, a first acceleration of which magnitude is a second preset threshold and a direction is the right of the virtual object, the fourth touch instruction being used for instructing to control the virtual object to move to the right.

In another embodiment, the control module 1003 is configured to adjust a second orientation of the virtual object during the falling process, the second orientation of the virtual object referring to a pitch angle in attitude angles of the virtual object.

In another embodiment, the control module 1003 is configured to:

adjust, when a direction of the first acceleration is a viewing angle direction, the second orientation of the virtual object during the falling process, a pitch angle of the virtual object after the adjustment and a pitch angle of the viewing angle being the same; and adjust, when a direction of the first acceleration is a reverse direction of the viewing angle direction, the second orientation of the virtual object during the falling process, a pitch angle of the virtual object after the adjustment being 0°.

In another embodiment, the control module 1003 is further configured to adjust the body posture of the virtual object according to the touch operation during the falling process.

According to the apparatus provided in the embodiments of the present disclosure, by detecting a touch operation in a virtual joystick region, an acceleration of a virtual object is determined with reference to factors such as the touch operation, the viewing angle, and the gravitational acceleration, to control a movement of the virtual object. A direction of the acceleration is not fixed and magnitude of the acceleration is not equal to zero, to enable the virtual object to move toward any direction, and further enable the virtual object to accelerate or decelerate, so that actions of a real person can be realistically simulated.

When the virtual object control apparatus provided in the foregoing embodiment controls the virtual object, the apparatus is described on the basis of function modules. In the practical application, the functions may be allocated to and completed by different function modules according to requirements. That is, an internal structure of the apparatus may be divided into different function modules, to complete all or some of the functions described above. In addition, the virtual object control apparatus and the virtual object control method provided in the foregoing embodiments belong to the same concept. For a specific implementation process, refer to the method embodiment, and details are not described herein again.

Figure 11:
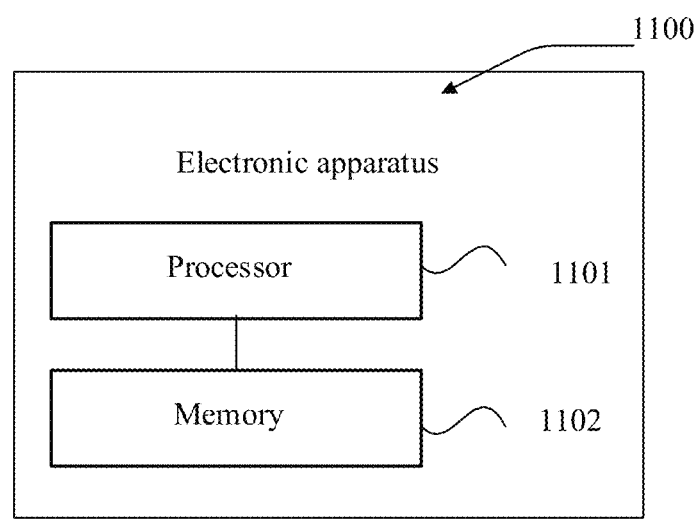
FIG. 11 is a schematic structural diagram of an electronic apparatus 1100 according to an embodiment of the present disclosure.

FIG. 11 is a schematic structural diagram of an electronic apparatus 1100 according to an embodiment of the present disclosure. The electronic apparatus 1100 may be provided as a terminal, and the electronic apparatus 1100 may vary significantly due to different configurations or performance, and may include one or more central processing units (CPU) 1101 and one or more memories 1102, where the memory 1102 stores at least one instruction, and the at least one instruction is loaded and executed by the processor 1101 to implement the following steps:

determining, when a touch operation on a control region is detected, a viewing angle of a virtual scene, the control region being used for controlling a movement manner of a virtual object in the virtual scene;

obtaining, based on the touch operation in the control region, the viewing angle, and the gravitational acceleration, an acceleration of the virtual object during a falling process; and controlling the virtual object to fall according to the acceleration in the virtual scene.

In one implementation, the processor 1101 is further configured to:

detect a location of the virtual object in the virtual scene; and perform the operation of determining a viewing angle of a virtual scene when detecting that the virtual object is located in a sky region in the virtual scene.

In one implementation, the processor 1101 is further configured to:

obtain, when detecting that the virtual object is located in a non-sky region in the virtual scene, based on a touch operation in the control region, an acceleration corresponding to the touch operation; and control the virtual object to move according to the acceleration in the virtual scene.

In one implementation, the processor 1101 is further configured to:

adjust, when a viewing angle adjusting operation is detected, the viewing angle according to the viewing angle adjusting operation, the viewing angle adjusting operation being used for adjusting the viewing angle of the virtual scene; and adjust a first orientation of the virtual object according to a viewing angle after the adjustment, the first orientation of the virtual object referring to a yaw angle in attitude angles of the virtual object.

In one implementation, the processor 1101 is configured to:

receive a touch instruction triggered by the touch operation;

obtain a first acceleration according to the touch instruction and the viewing angle; and perform vector summation calculation on the first acceleration and the gravitational acceleration, to obtain an acceleration of the virtual object.

In one implementation, the processor 1101 is further configured to:

use the gravitational acceleration as the acceleration of the virtual object during a falling process, when no touch operation in the control region is detected.

In one implementation, the processor 1101 is configured to:

obtain, if the touch instruction is a first touch instruction, a first acceleration with a magnitude as a first preset threshold and a direction as a viewing angle direction, the first touch instruction being used for instructing to control the virtual object to accelerate to move.

In one implementation, the processor 1101 is configured to:

obtain, if the touch instruction is a second touch instruction, a first acceleration with a magnitude as a first preset threshold and a direction as a reverse direction of a viewing angle, the second touch instruction being used for instructing to control the virtual object to decelerate to move.

In one implementation, the processor 1101 is configured to:

obtain, if the touch instruction is a third touch instruction, a first acceleration of which magnitude is a second preset threshold and a direction is the left of the virtual object, the third touch instruction being used for instructing to control the virtual object to move to the left.

In one implementation, the processor 1101 is configured to:

obtain, in a case that the touch instruction is a fourth touch instruction, a first acceleration of which magnitude is a second preset threshold and a direction is the right of the virtual object, the fourth touch instruction being used for instructing to control the virtual object to move to the right.

In one implementation, the processor 1101 is configured to:

adjust a second orientation of the virtual object during the falling process, the second orientation of the virtual object referring to a pitch angle in attitude angles of the virtual object.

In one implementation, the processor 1101 is configured to:

adjust, when a direction of the first acceleration is a viewing angle direction, the second orientation of the virtual object during the falling process, such that a pitch angle of the virtual object after the adjustment and a pitch angle of the viewing angle being the same; and adjust, when a direction of the first acceleration is a reverse direction of the viewing angle direction, the second orientation of the virtual object during the falling process, such that a pitch angle of the virtual object after the adjustment being 0°.

In one implementation, the processor 1101 is further configured to adjust a body posture of the virtual object according to the touch operation during a falling process.

The electronic apparatus 1100 may further include components such as a wired or wireless network interface, a keyboard, and an input/output device, to facilitate input/output. The electronic apparatus 1100 may further include another component configured to implement functions of a device, and details are not described herein.

In an exemplary embodiment, a computer-readable storage medium storing a computer program is further provided, for example, a memory storing a computer program. The computer program, when executed by a processor, implements the foregoing virtual object control method. For example, the computer-readable storage medium may be a read-only memory (ROM), a random access memory (RAM), a compact disc read-only memory (CD-ROM), a magnetic tape, a floppy disk, an optical data storage device, or the like.

Persons of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of the present disclosure, and are not intended to limit the present disclosure. Any modification, equivalent replacement, and improvement made without departing from the spirit and principle of the present disclosure shall fall within the protection scope of the present disclosure.

What is claimed is:

1. A virtual object control method, applied to an electronic apparatus with a display, the method comprising:
    determining, when a touch operation in a control region is detected, a viewing angle of a virtual scene, wherein the control region is used for controlling a movement manner of a virtual object in the virtual scene;
    receiving a touch instruction triggered by the touch operation;
    obtaining a first acceleration according to the touch instruction and the viewing angle;
    performing vector summation calculation on the first acceleration and a gravitational acceleration, to obtain an acceleration of the virtual object during a falling process; and
    controlling the virtual object to fall according to the acceleration in the virtual scene.

2. The method according to claim 1, wherein when the touch operation in the control region is detected, the method further comprises:
    detecting a location of the virtual object in the virtual scene; and
    determining a viewing angle of the virtual scene when detecting that the virtual object is located in a sky region in the virtual scene.

3. The method according to claim 2, wherein after detecting the location of the virtual object in the virtual scene, the method further comprises:
    obtaining, when detecting that the virtual object is located in a non-sky region in the virtual scene, based on a touch operation in the control region, an acceleration corresponding to the touch operation; and
    controlling the virtual object to move according to the acceleration in the virtual scene.

4. The method according to claim 1, further comprising:
    adjusting, when a viewing angle adjusting operation is detected, the viewing angle according to the viewing angle adjusting operation, wherein the viewing angle adjusting operation is used for adjusting the viewing angle of the virtual scene; and
    adjusting a first orientation of the virtual object according to the viewing angle after the adjustment, wherein the first orientation of the virtual object refers to a yaw angle in attitude angles of the virtual object.

5. The method according to claim 1, wherein the method further comprises:
    using the gravitational acceleration as the acceleration of the virtual object during the falling process, when no touch operation in the control region is detected.

6. The method according to claim 1, wherein the obtaining a first acceleration according to the touch instruction and the viewing angle comprises:
    obtaining, when the touch instruction is a first touch instruction, a first acceleration of which magnitude is a first preset threshold and a direction is a viewing angle direction, wherein the first touch instruction is used for controlling the virtual object to accelerate.

7. The method according to claim 1, wherein the obtaining a first acceleration according to the touch instruction and the viewing angle comprises:
    obtaining, when the touch instruction is a second touch instruction, a first acceleration of which magnitude is a first preset threshold and a direction is a reverse direction of a viewing angle direction, wherein the second touch instruction is used for controlling the virtual object to decelerate.

8. The method according to claim 1, wherein the obtaining a first acceleration according to the touch instruction and the viewing angle comprises:
    obtaining, when the touch instruction is a third touch instruction, a first acceleration of which magnitude is a second preset threshold and a direction is the left of the virtual object, wherein the third touch instruction is used for controlling the virtual object to move to the left.

9. The method according to claim 1, wherein the obtaining a first acceleration according to the touch instruction and the viewing angle comprises:
    obtaining, when the touch instruction is a fourth touch instruction, a first acceleration of which magnitude is a second preset threshold and a direction is the right of the virtual object, wherein the fourth touch instruction is used for controlling the virtual object to move to the right.

10. The method according to claim 1, wherein the controlling the virtual object to fall according to the acceleration in the virtual scene comprises:
    adjusting a second orientation of the virtual object during the falling process, wherein the second orientation of the virtual object refers to a pitch angle in attitude angles of the virtual object.

11. The method according to claim 10, wherein the adjusting a second orientation of the virtual object during the falling process comprises:
  adjusting, when a direction of the first acceleration is a viewing angle direction, the second orientation of the virtual object during the falling process, such that a pitch angle of the virtual object after the adjustment and a pitch angle of the viewing angle is the same; and
  adjusting, when a direction of the first acceleration is a reverse direction of the viewing angle direction, the second orientation of the virtual object during the falling process, such that a pitch angle of the virtual object after the adjustment is 0°.

12. The method according to claim 1, wherein the method further comprises: adjusting a body posture of the virtual object according to the touch operation during the falling process.

13. An electronic apparatus, comprising a memory for storing computer readable instructions and a processor in communication with the memory, wherein the processor is configured to execute the computer readable instructions to cause the electronic apparatus to:
  determine, when a touch operation in a control region is detected, a viewing angle of a virtual scene, wherein the control region is used for controlling a movement manner of a virtual object in the virtual scene;
  receive a touch instruction triggered by the touch operation;
  obtain a first acceleration according to the touch instruction and the viewing angle;
  perform vector summation calculation on the first acceleration and a gravitational acceleration, to obtain an acceleration of the virtual object during a falling process; and
  control the virtual object to fall according to the acceleration in the virtual scene.

14. The electronic apparatus according to claim 13, wherein the processor, when executing the computer readable instructions to cause the electronic apparatus to obtain an acceleration of the virtual object during a falling process based on the touch operation in the control region, the viewing angle, and the gravitational acceleration, is configured to cause the electronic apparatus to:
  detect a location of the virtual object in the virtual scene; and
  determine a viewing angle of the virtual scene when detecting that the virtual object is located in a sky region in the virtual scene.

15. The electronic apparatus according to claim 14, wherein the processor, after executing the computer readable instructions to cause the electronic apparatus to detect a location of the virtual object in the virtual scene, is configured to cause the electronic apparatus to:
  obtain, when detecting that the virtual object is located in a non-sky region in the virtual scene, based on a touch operation in the control region, an acceleration corresponding to the touch operation; and
  control the virtual object to move according to the acceleration in the virtual scene.

16. The electronic apparatus according to claim 13, wherein the processor is further configured to cause the electronic apparatus to:
  adjust, when a viewing angle adjusting operation is detected, the viewing angle according to the viewing angle adjusting operation, wherein the viewing angle adjusting operation is used for adjusting the viewing angle of the virtual scene; and
  adjust a first orientation of the virtual object according to a viewing angle after the adjustment, wherein the first orientation of the virtual object refers to a yaw angle in attitude angles of the virtual object.

17. The electronic apparatus according to claim 13, wherein the processor is further configured to cause the electronic apparatus to:
  use the gravitational acceleration as the acceleration of the virtual object during the falling process, when no touch operation in the control region is detected.

18. A non-transitory storage medium for storing computer readable instructions, the computer readable instructions, when executed by one or more processors, causing the one or more processors to:
  determine, when a touch operation in a control region is detected, a viewing angle of a virtual scene, wherein the control region is used for controlling a movement manner of a virtual object in the virtual scene;
  receive a touch instruction triggered by the touch operation;
  obtain a first acceleration according to the touch instruction and the viewing angle;
  perform vector summation calculation on the first acceleration and a gravitational acceleration, to obtain an acceleration of the virtual object during a falling process; and
  control the virtual object to fall according to the acceleration in the virtual scene.

* * * * *